Sept. 14, 1965
HUGH L. DRYDEN, DEPUTY ADMINISTRATOR OF THE NATIONAL AERONAUTICS AND SPACE ADMINISTRATION
SPACE VEHICLE ATTITUDE CONTROL
3,206,141
Filed Sept. 29, 1961
5 Sheets-Sheet 1
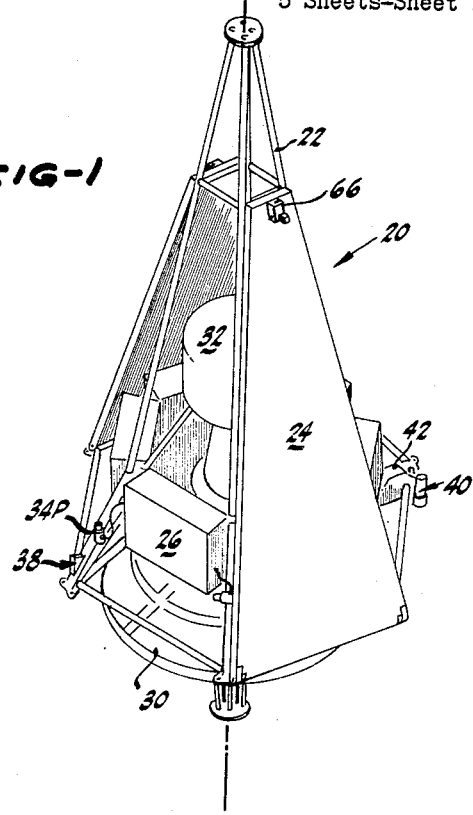
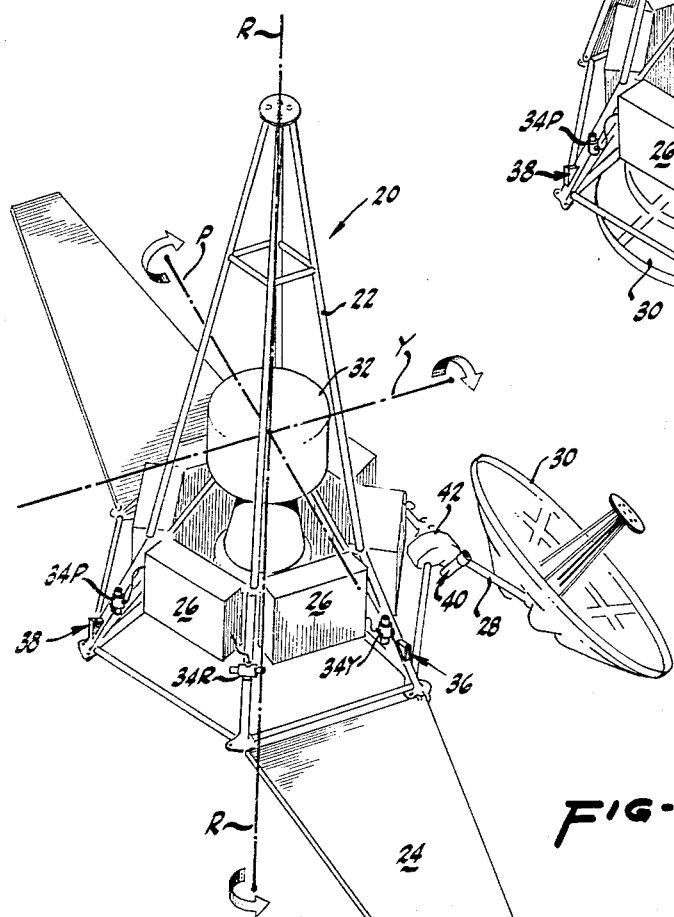
HOWARD C. VIVIAN
JAMES D. ACORD
INVENTORS
BY
ATTORNEYS

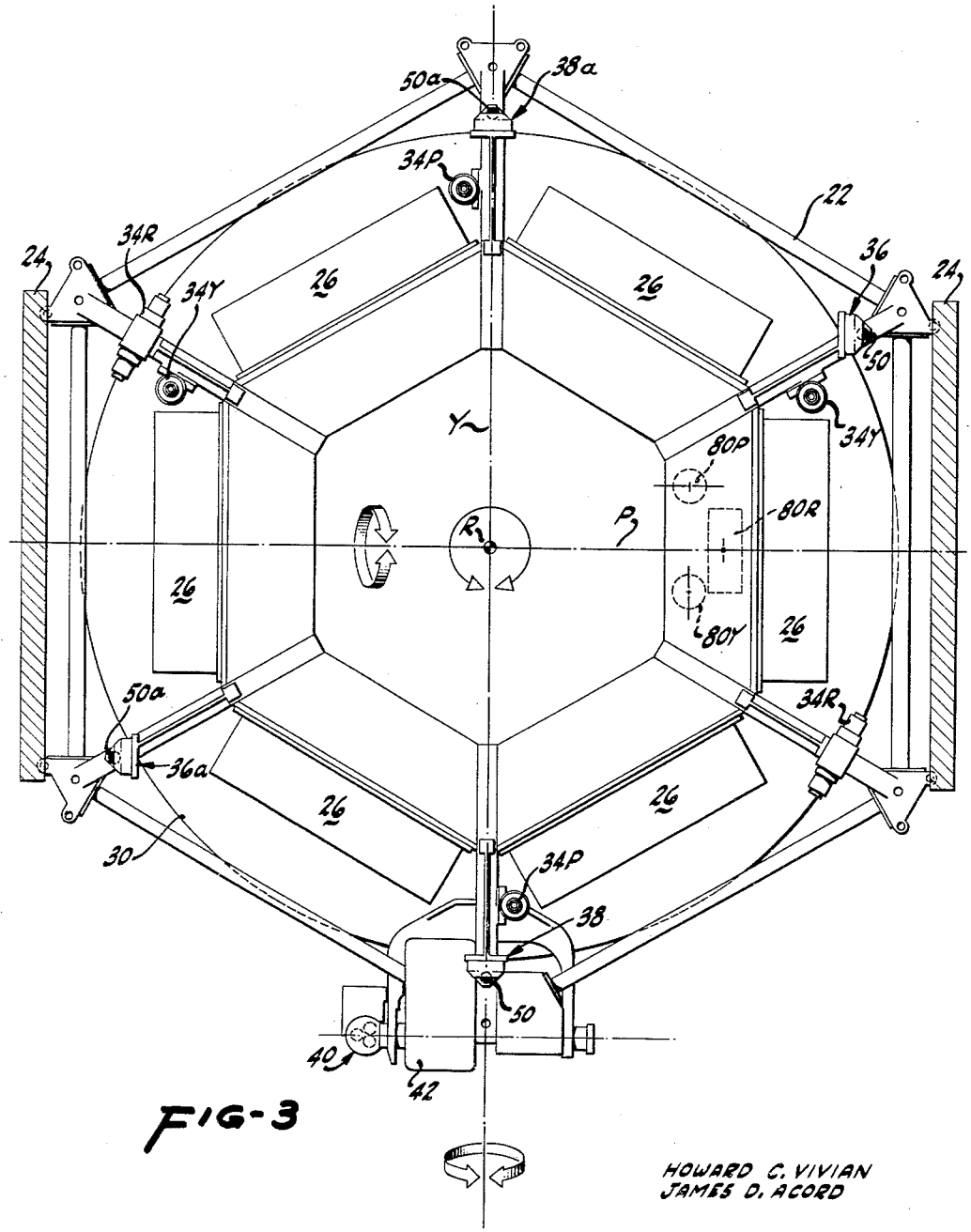

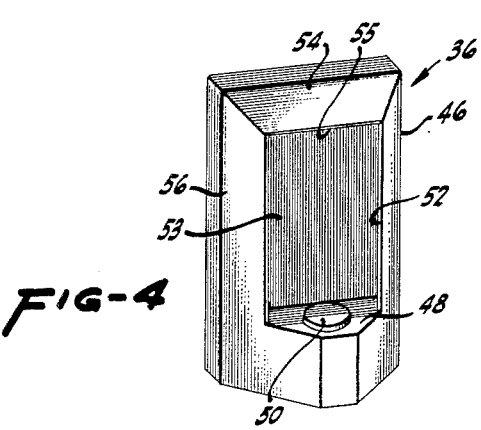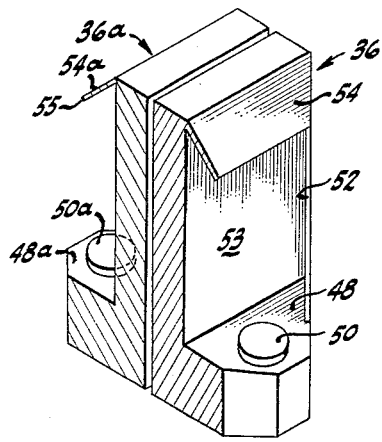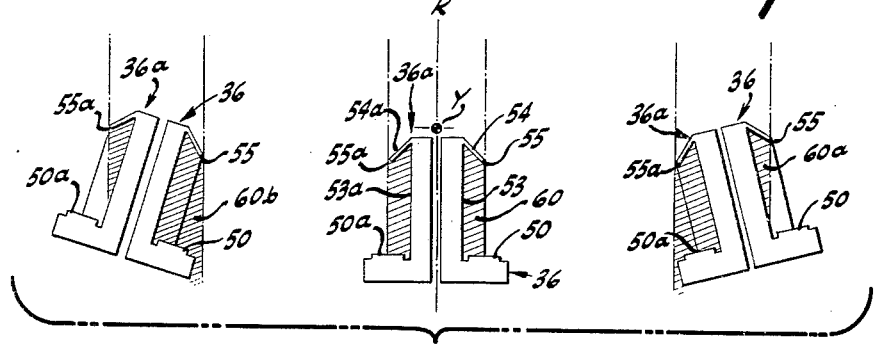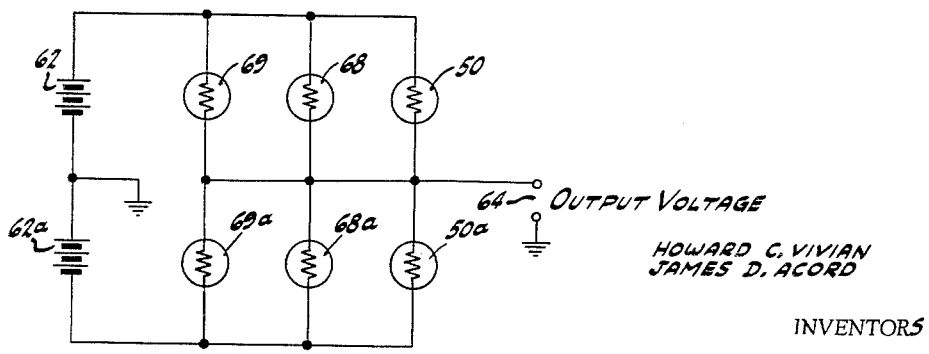

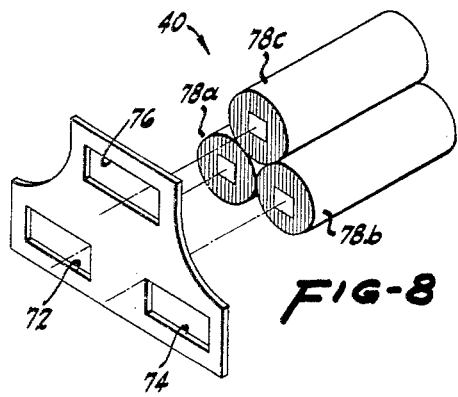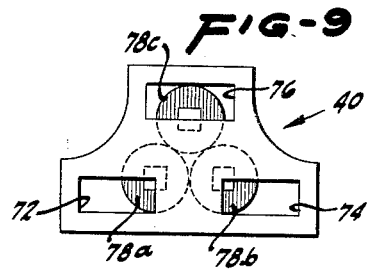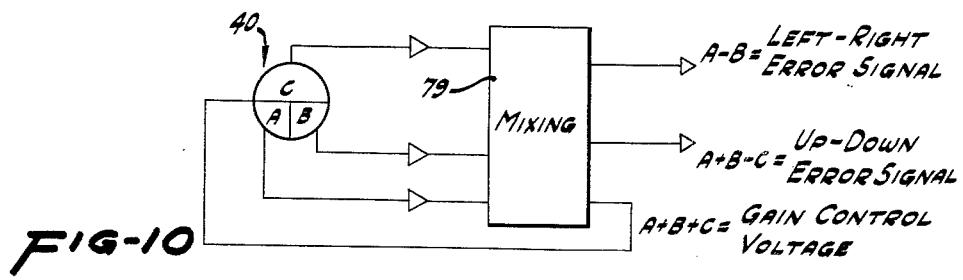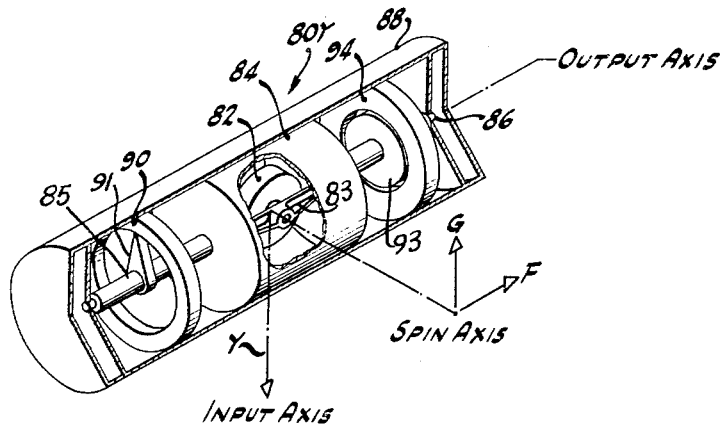

Sept. 14, 1965   HUGH L. DRYDEN, DEPUTY   3,206,141
ADMINISTRATOR OF THE NATIONAL
AERONAUTICS AND SPACE
ADMINISTRATION
SPACE VEHICLE ATTITUDE CONTROL
Filed Sept. 29, 1961                    5 Sheets-Sheet 5
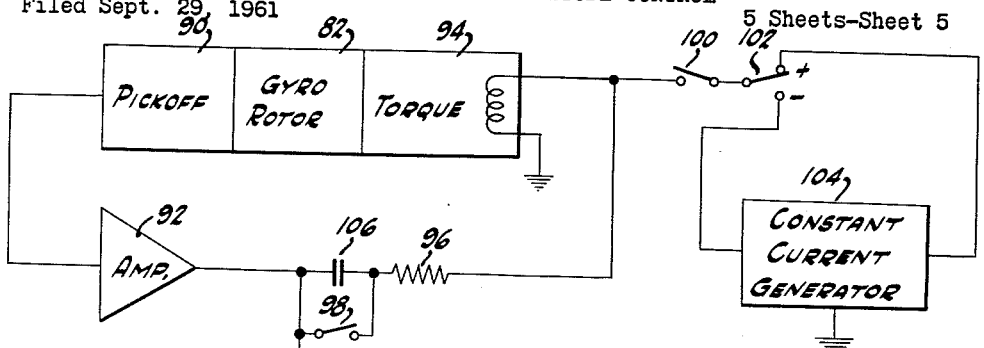
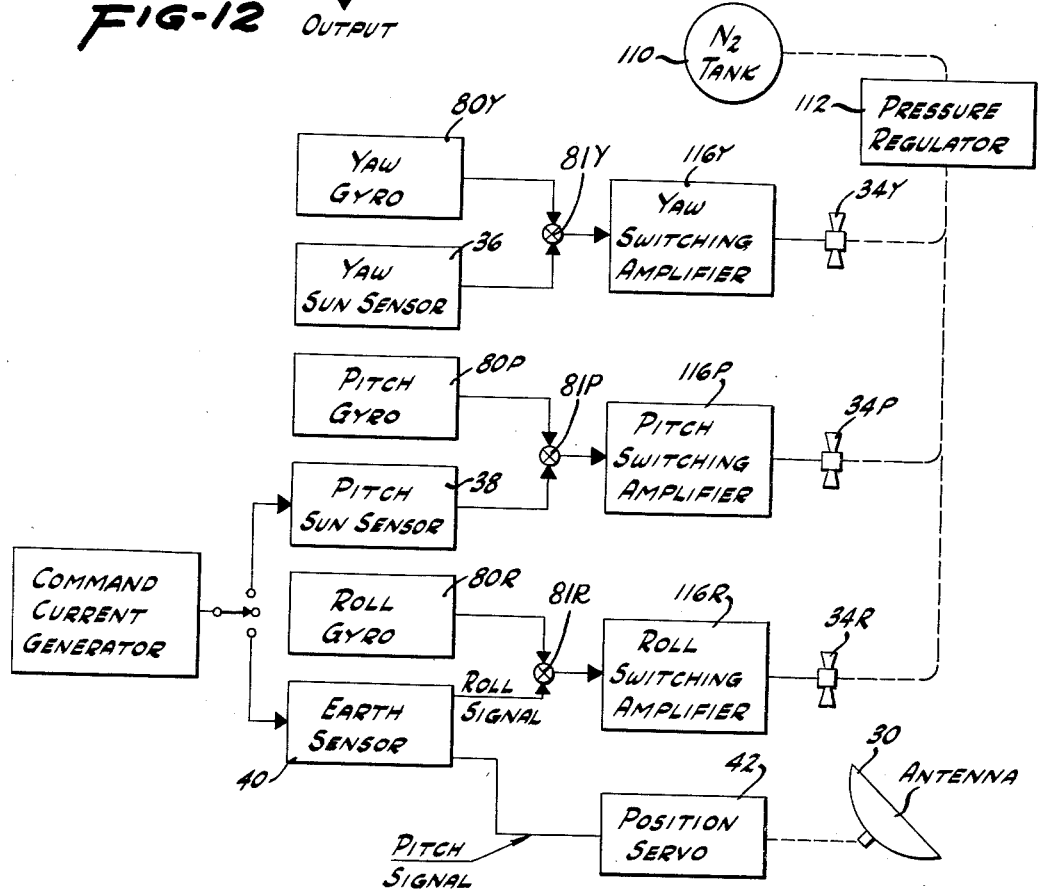
HOWARD C. VIVIAN
JAMES D. ACORD
INVENTORS
BY
ATTORNEYS United States Patent Office 3,206,141
Patented Sept. 14, 1965

3,206,141
SPACE VEHICLE ATTITUDE CONTROL
Hugh L. Dryden, deputy administrator of the National Aeronautics and Space Administration, with respect to an invention of Howard C. Vivian and James D. Acord
Filed Sept. 29, 1961, Ser. No. 180,379
8 Claims. (Cl. 244—1)

This invention relates to space vehicles and, more particularly, to a system for controlling the attitude or orientation of a space vehicle in transit, and for detecting and correcting deviations from a desired attitude condition.

In unmanned vehicles for space travel it is essential that some system be provided to maintain some degree of control over the flight attitude, at least during certain periods. Particularly when it is desired to impart a component of thrust to a space vehicle in transit, it is essential that the vehicle be oriented with respect to some fixed reference so that the thrust will be delivered in the proper direction. Further, when signal transmission is employed for navigation or communication with the space vehicle it is, of course, more efficiently and advantageously accomplished by directing the receiving antenna toward the Earth. An efficient, properly functioning orientation system or attitude control system may also be employed advantageously for the purpose of orienting solar cells toward the Sun; for moving, pointing and for ejecting equipment for scientific experiments; and for controlling the temperature of the aircraft by utilizing the Sun's radiation.

Generally, problems of attitude control differ for the two basic modes of operation which a space vehicle undergoes during flight. The first, or cruise mode, occurs when the primary function of the vehicle is to travel from one place to another under its own momentum and the control system functions only to control orientation of the vehicle with respect to the Sun and the Earth while the second, or active mode, occurs during those phases of flight when attitude control is vitally necessary. Such active modes occur during the initial acquisition phase when the references for attitude control are acquired and adapted, during maneuvers in mid-flight as when trajectory is corrected by firing a rocket motor in the appropriate direction, and during the terminal phase when scientific experiments are conducted, messages are transmitted, photographs taken, etc. During portions of the cruise mode, it may be possible to eliminate all attitude control, or, at most, to maintain attitude control within a range of permissible deviation. On the other hand, during active modes of flight, as when a rocket motor is being fired for the mid-course maneuver, it is essential that attitude control be maintained within extremely close tolerances.

In accordance with this invention, the vehicle is provided with Sun sensors which are directed along one attitude axis of the vehicle, e.g. the roll axis and seek the center of the Sun to signal any deviation of that axis about the other two axes from the reference line to the Sun. This provides attitude control about two of the axes, and control about the third axis may be achieved by a more sensitive device responsive to energy of reflected sunlight on the face of the Earth. The Earth sensor is mounted on an arm which is pivoted on the vehicle and carries a directional antenna for reception of Earth signals. The arm pivots only in one plane of the third axis, preferably a plane also containing one of the other two axes. Therefore, when the Earth sensor locks in the Earth's reflected light, it stabilizes the vehicle with respect to the third axis and also aims the antenna. Like the Sun sensor, the Earth sensor generates signals indicative of the direction of deviation, if any.

Coupled with these celestial reference devices the vehicle embodied in this invention employs three gyroscopes to orient the vehicle in any arbitrary direction with respect to the Sun and Earth reference directions for short periods of time. The gyroscopes are connected as rate gyroscopes, and in order to orient the entire spacecraft away from its zero reference position, a constant rate of turn may be commanded for a controlled period of time about each of three mutually orthogonal directions. The new position is maintained by using the three gyros to detect any angular rates which may occur after the turns are completed and nulling these rates to zero with the attitude control actuators.

A series of actuators are provided to produce corrective torque in response to any deviations indicated from the desired attitude by the sensors or the gyros. In the vehicle embodying this invention, it is proposed that cold gas jet system actuators be employed. The components of such a system include the gas storage tank, the regulators and a plurality of nozzle valves with interconnecting piping. Each nozzle valve is an integral assembly consisting of a nozzle plus an electrically operated valve which is opened when it is desired to rotate the spacecraft. The valve and nozzle are opened whenever the signals from the gyroscopes and position sensors exceed a certain value preset within a switching amplifier.

Other objects, advantages and functions of this invention will become apparent from a reading of the specification following in connection with the accompanying drawings wherein:

FIGS. 1 and 2 are isometric views of a space vehicle embodying features of this invention with solar panels retracted and extended respectively;

FIG. 3 is a plan view of the space vehicle looking rearwardly along the roll axis;

FIG. 4 is an isometric view of a Sun sensing device component forming a feature of this invention;

FIG. 5 is an isometric view partially in section of a complete assembly of two Sun sensing components;

FIG. 6 is a schematic illustration of a method of operation of the Sun sensing device;

FIG. 7 is an electrical circuit diagram including the Sun sensing devices of FIG. 5;

FIG. 8 is an isometric schematic illustration of the Earth sensing device forming a part of this invention;

FIG. 9 is a schematic view in elevation of the Earth sensing device;

FIG. 10 is an illustration of an electrical circuit utilizing the Earth sensor;

FIG. 11 is a gyroscope forming a part of this invention;

FIG. 12 is an illustration of an electric circuit including the gyroscope of FIG. 11; and FIG. 13 is a control circuit forming a part of this invention.

Referring now to the drawings, the space vehicle 20 may be of any suitable construction but, for purposes of illustration, it is here shown simply as a *pyramidal* framework 22. Hingedly connected to the framework 22 is a pair of oppositely extending solar panels 24, each carrying solar cells (not shown) to supply electrical power for the vehicle instrumentation and controls shown generally at 26. The solar panels 24 are folded inwardly in the condition shown in FIG. 1 until after the vehicle is projected into space, at which time the panels are extended to the condition of FIG. 2 by any suitable means (not shown). When the vehicle is in the desired condition of attitude stabilization, the solar panels 24 are oriented so as to direct the solar cells toward the Sun with the panel hinges disposed parallel to the vehicle yaw axis Y. Also, pivotally mounted on the vehicle body 22 is an arm 28 which carries a high-gain directional communication antenna 30. The arm 28 is pivotable in only one plane containing the vehicle roll axis R and, preferably, the yaw axis Y. Hence, it may be regarded as stationary on the vehicle with respect to the roll and yaw axes, and pivotable about the pitch axis P.

A rocket motor 32 adapted to provide thrust for mid-flight maneuvers is aimed directly back along the roll axis R. The attitude of the vehicle may be stabilized about the three mutually orthogonal attitude axes R, P and Y by delivering thrust forces about these axes in order to achieve, maintain and/or restore the vehicle to a reference attitude. Preferably, the thrust or torque actuators include jets 34R for torquing the vehicle about the roll axis, and jets 34P and 34Y for providing torque about the pitch and yaw axes, respectively.

The nozzles or actuators are operated in response to signals received from sensing devices, such as Sun sensors 36 and 38, which are arranged to detect deviations of the roll axis R with respect to the yaw and pitch axes Y and P. Additionally, the roll-controlling jets 34R are operated in response to signals from an Earth sensor 40 which fixes a reference plane of the roll axis with respect to a line to the Earth, to establish a reference disposition of that plane and, hence, control the attitude of the vehicle about the roll axis. Also, in order to save power or increase the range of operation, the Earth sensor actuates a servo motor or the like 42 controlling the arm 28 to keep the antenna 30 pointed directly at the Earth.

Referring now to FIGS. 4 to 7, each component of a Sun sensor such as 36 comprises a casing 46 from which is extended a platform or shelf 48, on which is carried a photosensitive disc 50. Any suitable photosensitive member wherein an electrical characteristic is varied in accordance with illumination would be satisfactory for use and, for this purpose materials such as cadmium sulphide, the resistance of which is varied with illumination, have been found to be particularly suitable for use as detectors.

Above a rectangular recess 52, into which a portion of the detector element extends, the top wall 54 of the casing forms a light shield or mask which extends forwardly and downwardly toward the platform 48, so that light from above will cast a shadow which is sharply defined by the forward edge 55 of the mask. Preferably, similar side shields 56 are provided as lateral extension of the mask.

FIG. 6 illustrates schematically the method of operation of the Sun sensor components 36, 38 which are arranged in pairs, with the forward edges 55, 55a of the opaque light mask being disposed parallel to each other and to the attitude axis about which deviation is being sensed. When the back walls 53, 53a, which together define a shadow vane, point directly at the Sun, both photosensitive members are equally darkened by the shadow 60 to the extent of approximately one-half their areas and, since the detectors 50, 50a are matched, the electrical characteristics thereof are balanced. On the other hand, should the sensors 36, 38 be tilted with the vehicle so that they no longer point directly at the Sun, the oblique shadow 60a or 60b cast by the shades 54, 54a does not fall evenly upon the two photosensitive members 50, 50a and the electrical characteristics are not in balance.

In the electrical circuit diagram of FIG. 7, the photosensitive devices 50, 50a are connected as resistors in a bridge circuit and with the resistance equal, i.e. when the sensor points directly toward the Sun, the bridge circuit is balanced so that the direct-current sources 62, 62a are in equal opposition and no output is delivered at 64. However, when the shadow vane is tilted in one direction or the other with respect to the incidence lines of the Sun's rays, one photosensitive member 50 or 50a receives more light and the resistances are unbalanced. As a consequence, an appropriate signal is delivered to the output 64 indicative of the amount and the direction of inclination from the desired reference plane.

Each of the matched pair of sensing components is disposed with respect to one of the yaw and pitch attitude axes. For example, each yaw-sensing component 36 is pointed along the roll axis R with the forward shadow vane edge 55 disposed parallel to the yaw axis Y, so that a deviation in illumination from equality will reflect a tilting of the central shadow vane 62 from a direct line to the Sun. Similarly, differences in illumination of the photosensitive members in matched sensor component 38 reflect an angular deviation of the roll axis R about the pitch axis P. It is to be noted that the casings 40 of matched pairs of sensing devices may be mounted directly back-to-back, or, as shown in FIG. 3, they may be mounted on opposite sides of the vehicle frame 22. It is only necessary that they be disposed in the proper relationship to the vehicle's attitude axes.

In addition to the Sun sensors, a group of Sun finders 66 (FIG. 1) may be provided about the periphery of the vehicle. The Sun finders 66 are of structure similar to that of the Sun sensors, and may be connected as part of the same circuit, the only difference being that they are arranged around the surface of the vehicle in order to provide a spherical field of view. The detectors 68, 68a and 69, 69a of the Sun finders are arranged in a bridge circuit so that the electrical balance is achieved when matched pairs disposed in opposite directions laterally are equally shaded while the Sun sensors 36, 38, which are directed along the roll axis, are balanced in equal illumination.

Flight attitude with respect to pitch and yaw having been detected by the Sun sensors, it is the function of the Earth sensor 40 (FIGS. 8 to 10) to initiate stabilization of the vehicle about the third axis, the roll axis R. The Earth sensor is mounted on the pivotable communication antenna arm 28 which preferably is initially disposed by suitable means (not shown) so that the Earth sensor points in the general direction of the Earth at one stage of its revolution with the vehicle about the roll axis. The function of the Earth sensor 40 is similar to that of the Sun sensors 36, 38 except that it must, of course, be more sensitive in order to detect the smaller amount of light energy radiated from the Earth. For this purpose, the Earth sensor may be provided with optical devices to concentrate the light energy or, more sensitive detectors such as photomultiplier tubes may be provided.

The Earth sensor comprises a mask in which a pair of windows or apertures 72, 74 are spaced laterally and a third window 76 is spaced above the first pair so that the mask permits passage of three beams of light. Behind each aperture is disposed the sensitive cathode of a photomultiplier tube 78a, 78b and 78c. The photomultiplier tubes, like the windows, are arranged in a triangular pattern with the top tube 87c being balanced against the lower tubes and the two lower tubes 78a and 78b being balanced against each other. Thus, when the Earth sensor 40 is pointed directly toward the center of reflected light from the Earth, the top central aperture 76 exposes the upper one-half of the top photomultiplier tube while the lower apertures each expose the lower outside one-quarter of their respective photomultiplier tubes. In this condition of balance, the two lower photosensitive tubes 78a and 78b will each deliver the same amount of current and, together, the total current they deliver will equal that of the upper photosensitive tube 78c. Hence, when the signals generated by the lower tubes are equal, the Earth sensor is centered on the reflected light from the Earth with respect to left and right position and when the total current of the lower tubes equals the upper signal, the sensor is centered with respect to up and down position, indicating proper location of the antenna arm for maximum reception.

In the circuit shown in FIG. 10, the output signals from each of the photomultiplier tubes are fed to a mixer 79 wherein the signals from the lower tubes are compared and the differential signal $(A-B)$ is delivered as an output representative of the left or the right position error. Similarly, the signals from the lower tubes are added and the sum compared with the signal from the upper tubes so that the differential $(A+B-C)$ will be delivered as an output representative of up or down error. The sum signal, $A+B+C$, is used in a closed control loop to adjust the excitation voltage for the photomultipier tubes so that their output is substantially constant and independent of range. While each opening in the Earth sensor mask affords a 60° x 40° field of view, the sensor seeks the center of reflected sunlight on the face of the Earth and the system saturates when the sensor 40 moves away from the reference position through only a very small arc in either direction, and it holds its output for the remainder of its field of view.

On the space vehicle there is also provided an assembly of three gyroscopes 80R, 80P and 80Y (FIG. 3) each operative in conjunction with one of the three previously described position sensors, i.e. with respect to one of the three orthogonal attitude axes. Each gyroscope is connected as a rate gyroscope adapted to assist its associated Sun or Earth sensor by detecting a rate of rotation about the reference axis from the fixed disposition established by the sensor. Additionally, in response to signal, each gyroscope is operative to modify or alter the disposition of the appropriate vehicle attitude axis. Thus, the vehicle may be oriented with respect to three mutually orthogonal directions and the new position maintained by using the gyroscopes themselves to detect any angular rates deviation which may occur after the turns are completed.

Each of the three gyroscopes 80R, 80P and 80Y detects and controls rotation about a particular attitude axis. For example, as shown more particularly in FIG. 11, the gyro 80Y operates with the yaw axis Y as its input axis. The spinning rotor 82 of each gyroscope is rigidly mounted by support member 83 within a hollow closed cylindrical float 84 rotatably mounted on low friction pivot jewels or the like 86 within the gyroscope case 88. Because the spinning rotor 82 is rigidly secured to the end walls of the float 84 by support member 83 any precession of the rotor 82 will impart rotational movement to the cylindrical float 84 and shaft 85 which is rigidly fixed to the end walls of the float 84. The float is buoyed within the case so that the pivot jewels support virtually no weight and function primarily as location devices. In order to conserve electrical power in the space vehicle, the fluid within the case 88 is preferably of a low viscosity type which requires no heaters.

Any deviation force F of the space vehicle 20 tending to impart an angular rate of rotation about the input axis Y causes the gyroscope rotor 82 to precess about the output axis to produce a gyroscopic reaction in the direction of the arrow G acting about the output axis. The gyroscopic reaction G produces an increment of rotation in the float 84, but as soon as the float starts to turn, a position pick-off device 90 detects the angular motion and arm 91 which is rigidly secured to the shaft 85 generates a signal proportional to the rate of rotation of the space vehicle 20 about input axis. The signal is amplified at 92 (FIG. 12) and delivered to a torqueing device 94 which produces a torque about the output axis in proportion to the current flowing through it, causing the gyroscope rotor 82 to precess about its input axis Y toward its null position. The torqueing device 94 includes an inner rotor or coil 93 fixed to the shaft 85 so that the amplified signal at 92 applied to the outer coil or ring of the torqueing device 94 will impart a torque to the shaft 85, float 84 and support member 83. Since the case 88 is rigidly secured to the space vehicle and such vehicle has considerable inertia compared to the torque on the shaft 85 and coil 93 created by the precession of rotor 82 the torqueing device 94 will cause the rotor 82 to rotate about the output axis toward the null position and will not move the space vehicle and case 88 relative to the new position taken by the rotor 82 due to deviation force F. This opposing torque tending to restore the rotor to neutral position conditions the device as a rate gyro in that it will deliver a signal in response to position change against an opposing force, i.e. rotational rate and not merely position change. In the steady state, the current flowing through the torqueing device 94 is proportional to angular input rate and, hence, a voltage proportional to angular rate is obtained. The resistor 96 is included in the circuitry of the rate gyro to insure that the output signal from the gyro to the circuitry for controlling the operation of the controlling jet 34Y is of sufficient voltage to overcome the deadband of the switching amplifier 116Y as hereinafter described.

During the cruise and acquisition phases, switch 98 is closed and the gyro loop is closed through the resistance 96 which serves as a metering resistor for output voltage indication. However, during periods of commanded turns away from a zero reference position, a different circuit is required. During these maneuver phases, the Earth and Sun sensors are disconnected and switches 100 and 102 are closed to deliver a constant current of suitable polarity from a generator 104 to the gyroscope torqueing device 94 for a controlled period of time to command a constant rate of turn. The gyroscope loop is closed through both the resistor 96 and a capacitor 106 giving an output proportional to the mixed sum of inertial rate and position. The loop will deliver a current to produce an output across the series resistor 96, unless the gyroscope rotates about the input axis Y at a rate corresponding to the constant current. A signal proportional to the position error of the vehicle is provided by pick-off device 90 during the period of commanded turns by placing the capacitor 106 in series with the gyroscope torquer 94. Since the current flowing through the torquer is proportional to angular rate, the voltage across the capacitor builds up in proportion to the angular rate and therefore, is proportional to position. This position signal is zero if the angular position of the vehicle is at its desired value as required by the constant turn rate, but any deviation from the desired position causes a voltage to appear across the capacitor which is fed to attitude control actuators hereinafter to be described.

Referring now to FIGS. 3 and 13, there is shown a diagram of the actuation system which is operated in response to signals delivered from the position sensors 36, 38 and 40 and gyroscopes 80R, 80P and 80Y to effect the correctional torques necessary to establish a desired attitude and to nullify deviations therefrom.

Included within the system are a gas storage tank 110, a pressure regulator 112 and a series of nozzle valves 34R, 34P and 34Y with interconnecting piping. Each valve is electrically operated in response to appropriate signals and the nozzles are opened when it is desired to rotate the spacecraft about the appropriate attitude axis. Dry nitrogen has been found to be particularly suited for the actuation system because of its relatively high specific impulse, and its chemical inertness. Preferably, the valves are arranged in pairs, each pair selectively to provide a torque in opposite directions for correction about the appropriate attitude axis depending upon the position sensor and gyroscope with which it is associated.

*Operation*

When the space vehicle separates from the rocket by means of which it is projected into space, it may be spinning about any arbitrary axis at a rate between 1,000 and 10,000 degrees per hour and it is the first function of the attitude control system to reduce this initial spin rate to zero. This is accomplished by the gyroscope assembly which senses the space vehicle 20 rotational rates about its three orthogonal axes and transmits voltage signals to operate the actuator valve jet nozzles 34R, 34P and 34Y. For example, if the vehicle 20 is rotating about the Y axis at a rapid rate, an output voltage signal from the yaw gyro 80Y is fed through the mixer 81Y to the yaw switching amplifier 116Y to control the appropriate nozzle of the jet 34Y to decrease the rate of rotation as hereinafter described. When the angular rate has been reduced, the signals from the Sun finder 66 and Sun sensor 36, 38 circuits take over to operate the actuator jets to apply torques which orient the yaw and pitch Sun sensors toward the Sun. When the photosensitive discs 50, 50a of both Sun sensors are in perfect electrical balance, i.e. are of the same resistance, they establish a null position as to both pitch and yaw, and the roll axis of the space vehicle is disposed along the reference line from the space vehicle to the Sun. Since the shadow vanes 54, 54a of the Sun sensors continue to point directly at the Sun though the vehicle is rotated about its roll axis, their photosensitive members will remain in electrical balance while the vehicle turns about the roll axis to seek out the Earth. By the same token, it is necessary to fix the yaw and/or pitch axes of the vehicle with respect to a second reference line in order to stablize the vehicle with respect to the roll axis. This is the function of the Earth sensor 40. Since the antenna arm 28 on which the Earth sensor is mounted may be pivoted about only a single axis parallel to the pitch axis P of the space vehicle, the Earth sensor is fixed to the vehicle with respect to the plane of the yaw and the roll axes. Then, the vehicle can be stablized by fixing that plane with respect to another reference point in space. This is accomplished by orienting the plane of the yaw and roll axes to lie along the reference line from the vehicle to Earth. Thus, as soon as the Earth sensor locks onto the center of light reflected from the Earth's surface, the angular position of the vehicle about the roll axis is determined. At the same time, when the up and down error in the Earth sensor is zero, the proper angular disposition of the antenna arm is established for maximum reception. This particular "pitch" error signal from the Earth sensor may be applied in a servo loop to drive a motor 42 and gear train (not shown) in order to maintain the antenna pointed at the Earth.

After the Sun and Earth have been acquired, the acquisition phase is completed and the first cruise phase is started. During this phase, the attitude control loop involving the Earth and Sun sensors and the actuators preferably operate in a limit cycle mode.

The switching amplifiers 116 of FIG. 13 are transistor amplifiers designed to have a deadband and hysteresis which operates the valve and nozzle 34 only when the input (the sum of the rate gyro plus the position sensor signal) to the switching amplifier is greater than a certain value in order to prevent valve chatter and to conserve gas. During the initial acquisition phase, when the spacecraft is tumbling, the rate gyro output signal overpowers the position signal and causes the appropriate valves to remain open continuously. Thus, a continuous torque acts to retard the rotation of the vehicle and to reduce its spin rate to zero. However, during the cruise phase, when the rates are very low and the vehicle is very close to the desired attitude, the valves are normally closed to minimize gas usage. When the angular position of the spacecraft drifts away from the desired attitude by an amount such that the position signal exceeds the threshold of the switching amplifier, the valve is opened momentarily and a pulse of torque is applied to the spacecraft.

While preferred embodiments of this invention have been shown, it is apparent that further modifications and changes will be suggested to those skilled in the art without departing from the spirit and scope of the invention defined by the claims appended hereto.

What is claimed is:

1. A system for controlling the attitude of a space vehicle about three orthogonal axes comprising
    first and second photosensitive devices mounted on said vehicle each sensitive to sunlight and operative to produce an electrical signal of a polarity indicative of the direction of deviation from parallel to a reference plane thereof, of the lines of incidence of Sun light rays impinging thereon,
    a third photosensitive device mounted on said vehicle sensitive to reflected sunlight from the Earth and operative to produce an electrical signal of a polarity indicative of the direction of deviation from parallel to a reference plane thereof of the lines of incidence of the Earth's reflected light rays impinging thereon,
    said first and second photosensitive devices being disposed with said reference plane thereof respectively parallel to first and second attitude axes of said vehicle and each being directed along a third attitude axis,
    said third photosensitive device having the reference plane thereof affixed along said first attitude axis,
    first, second, and third gyroscope devices operative to produce an electrical signal of a polarity indicative of input rotational movement about said first, second and third attitude axes respectively,
    each of said gyroscope devices including a pick-off device for generating a signal proportional to direction and amount of precessed motion resulting from input rotation about the appropriate attitude axis and means responsive to said signal for opposing said precessed motion,
    a first attitude sensing circuit, including said first photosensitive device and said first gyroscope device,
    a second attitude sensing circuit including said second photosensitive device and said second gyroscope device,
    a third attitude sensing circuit including said third photosensitive device and said third gyroscope device, and
    first, second and third electrically controlled actuator means connected to said first, second and third sensing circuits respectively for delivering a torque about said first, second and third axes respectively in response to an electrical signal.

2. The system for controlling the attitude of a space vehicle in claim 1 wherein each of said actuator devices comprises
    a storage tank for pressure fluid,
    a pair of nozzles directed to deliver jets in opposite directions about the appropriate attitude axis, and
    a normally neutral solenoid actuated valve means responsive to the polarity of an electrical signal delivered thereto for delivering said pressure fluid to said nozzles to form appropriate torque producing jets.

3. A system for controlling the attitude of a space vehicle about three orthogonal axes comprising
    first and second photosensitive devices mounted on said vehicle each sensitive to sunlight and operative to produce an electrical signal of a polarity indicative of the direction of deviation of the lines of incidence of Sun light rays impinging thereon from parallel to two reference planes,
    a third photosensitive device mounted on said vehicle sensitive to reflected sunlight from the Earth and operative to produce an electrical signal of a polarity indicative of the direction of deviation of the lines of incidence of the Earth's reflected light rays impinging thereon from parallel to a reference plane thereof,
    said first and second photosensitive devices being disposed with said reference planes thereof respectively parallel to the first and second attitude axes of said vehicle and each being directed along the third attitude axis,
    said third photosensitive device having the reference plane thereof fixed along said first attitude axis,
    first, second, and third gyroscope devices operative to produce an electrical signal of a polarity indicative of input rotational movement about said first, second and third attitude axes respectively, a first attitude sensing circuit including said first photosensitive device and said first gyroscope device, a second attitude sensing circuit including said second photosensitive device and said second gyroscope device, a third attitude sensing circuit including said third photosensitive device and said third gyroscope device, and first, second and third electrically controlled actuator means connected to said first, second and third sensing circuits respectively for delivering a torque about said first, second and third axes respectively in response to an electrical signal therein.

4. A system for controlling the attitude of a space vehicle about three orthogonal attitude axes comprising first and second photosensitive devices mounted on said vehicle each sensitive to sunlight and operative to produce an electrical signal indicative of a deviation of the line of incidence of sunlight impinging thereon from parallel to a reference plane thereof, a third photosensitive device on said vehicle sensitive to reflected light from a celestial body and operative to produce an electrical signal indicative of a deviation of the lines of incidence of reflected light rays impinging thereon from parallel to a reference plane thereof, said first and second devices being mounted along a third attitude axis with the reference planes thereof parallel to the first and second attitude axes respectively, said third device having its reference plane along said third attitude axis, and first, second and third electrically controlled actuator means connected to said first, second and third photosensitive devices respectively for delivering a torque about said first, second and third axes respectively in response to production of electric signals.

5. A system for controlling the attitude of a space vehicle comprising a first photosensitive device on said vehicle sensitive to light from one remote source disposed with respect to the plane of first and third orthogonal axes of said vehicle and operative to produce an electrical signal indicative of the direction of deviation of said plane from a reference position parallel to a line between said vehicle and said remote light source, a second photosensitive device on said vehicle sensitive to light from said one remote source disposed with respect to the plane of a second and said third orthogonal axes of said vehicle and operative to produce an electrical signal indicative of the direction of deviation of said plane from a reference position parallel to a line between said vehicle and said remote light source, first and second gyroscope devices operative to produce an electrical signal of a polarity indicative of rotational movement about said first and second orthogonal axes respectively, a first attitude sensing circuit including said first photosensitive device and said first gyroscope device, a second attitude sensing circuit including said second photosensitive device and said second gyroscope device, and first and second electrically controlled actuator means connected in said first and second attitude sensing circuits respectively for delivering a torque about said first and second axes in response to electrical signals, and a third photosensitive device on said vehicle sensitive to light from another remote source disposed with respect to a fixed plane of said roll axis and operative to produce an electrical signal indicative of the direction of deviation of said plane from a reference position parallel to a line betwen said vehicle and said another remote light source.

6. A system for controlling the attitude of a space vehicle comprising:

a first photosensitive device on said vehicle sensitive to light from one remote source disposed with respect to the plane of the yaw and roll axes of said vehicle and operative to produce an electrical signal indicative of the direction of deviation of said plane from a reference position parallel to a line between said vehicle and said remote light source, a second photo sensitive device on said vehicle sensitive to light from said remote source disposed with respect to the plane of the pitch and roll axes of said vehicle and operative to produce an electrical signal indicative of the direction of deviation of said plane from a reference position parallel to a line between said vehicle and said remote source, first and second electrically controlled actuator means connected to said first and second photo-sensitive devices respectively for delivering a torque about said yaw and pitch axes respectively in response to production of an electrical signal, a third photosensitive device on said vehicle sensitive to light from another remote source disposed with respect to a fixed plane of said roll axis of the vehicle and operative to produce an electrical signal indicative of the direction of deviation of said plane from a reference position parallel to a line between said vehicle and said another remote light source, and a third electrically controlled actuator means connected to said third photosensitive device and operative to deliver a torque about said roll axis in response to production of an electrical signal.

7. A system for controlling the attitude of a space vehicle comprising:

a first photosensitive device on said vehicle sensitive to light from one remote source disposed with respect to the plane of first and third orthogonal axes of said vehicle and operative to produce an electrical signal indicative of the direction of deviation of said plane from a reference position parallel to a line between said vehicle and said remote light source, a second photosensitive device on said vehicle sensitive to light from said one remote source disposed with respect to the plane of a second and said third orthogonal axes of said vehicle and operative to produce an electrical signal indicative of the direction of deviation of said plane from a reference position parallel to a line betwen said vehicle and said remote light source, first and second gyroscope devices operative to produce an electrical signal of a polarity indicative of rotational movement about said first and second orthogonal axes respectively, a first attitude sensing circuit including said first photosensitive device and said first gyroscope device, second attitude sensing circuit including said second photosensitive device and said second gyroscope device, first and second electrically controlled actuator means connected in said first and second attitude sensing circuits respectively for delivering a torque about said first and second axes in response to electrical signals, a third photosensitive device on said vehicle sensitive to light from another remote source disposed with respect to a fixed plane of said third axis and operative to produce an electrical signal indicative of the direction of deviation of said fixed plane from a reference position parallel to a line between said vehicle and said another remote light source, and a third electrically controlled actuator means connected to said third photosensitive device and operative to deliver a torque about said roll axis in response to an electrical signal.

8. A system for controlling the attitude of a space vehicle comprising a first photosensitive device mounted on said vehicle to rotate therewith about the yaw axis of said vehicle, said first photosensitive device being sensitive to varying sunlight and being directed along the roll axis of said vehicle and operative to produce an electrical signal when said vehicle is so disposed with respect to said yaw axis that the Sun's light rays impinge upon said first device in a direction other than normal thereto, a second photosensitive device mounted on said vehicle to rotate therewith about the pitch axis of said vehicle, said second device being sensitive to varying sunlight and being directed along the roll axis of said vehicle and operative to produce an electrical signal when said vehicle is so disposed about said pitch axis that the Sun's light rays impinge upon said second device in a direction other than normal thereto, first and second electrically controlled actuator means connected to said first and second photosensitive devices respectively for delivering a torque about said yaw and pitch axes respectively in response to production of an electrical signal, a third photosensitive device mounted on said vehicle to rotate therewith about the roll axis of said vehicle, said third device being sensitive to reflected sunlight from a celestial body and being directed along a fixed plane of said roll axis to produce an electrical signal when said vehicle is disposed about said roll axis so that light rays reflected from said celestial body impinge upon said third device along lines other than normal thereto, and a third electrically controlled actuator means connected to said third photosensitive device for delivering a torque about said roll axis in response to production of an electrical signal.

References Cited by the Examiner

UNITED STATES PATENTS

| | | | |
|---|---|---|---|
| 2,403,387 | 7/46 | McLennan | 102—3 |
| 2,969,018 | 1/61 | Erst et al. | 244—14 |
| 2,974,594 | 3/61 | Boehm. | |

OTHER REFERENCES

Triplett: "Orbiting Astronomical Observatories," Navigation, Vol. 8, No. 1, Spring 1961, pp. 18–23.

Scull: "Guidance of Space Vehicles," Navigation, Vol. 8, No. 1, Spring 1961, pp. 24–33.

Trageser: "A Recoverable Interplanetary Space Probe," Astronautics, Vol. 5, No. 5, May 1960, pp. 32–35, 116, and 118–120.

Sweeney, "JPL Studies Future Solar Power Units," Aviation Week, Feb. 15, 1960, pp. 61–66.

Roberson: "Attitude Control of Satellites and Space Vehicles," Advances in Space Science, Vol. 2, 1960, Academic Press, New York and London, pp. 351–436.

FERGUS S. MIDDLETON, *Primary Examiner.*

CHESTER L. JUSTUS, *Examiner.*